United States Patent
Ishii et al.

[11] Patent Number: 5,975,418
[45] Date of Patent: *Nov. 2, 1999

[54] BAR CODE SCANNER WITH INCREASED NUMBER OF SCANNING BEAMS HAVING DIFFERENT DIRECTIONS

[75] Inventors: Mitsuharu Ishii; Toshimitsu Kumagai; Yuichirou Takashima, all of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/614,892

[22] Filed: Mar. 13, 1996

[30] Foreign Application Priority Data

Jun. 8, 1995 [JP] Japan ................................ 7-141504

[51] Int. Cl.$^6$ ............................................. G06K 7/10
[52] U.S. Cl. ..................... 235/462.37; 235/462.4; 235/459; 250/234
[58] Field of Search ......................... 235/467, 462, 235/459, 439, 454, 383, 462.33, 462.36, 462.37, 462.38, 462.39, 462.4; 250/234, 568

[56] References Cited

U.S. PATENT DOCUMENTS

| | | |
|---|---|---|
| 4,057,784 | 11/1977 | Tafoya ............................. 250/568 X |
| 4,652,732 | 3/1987 | Nickl .................................. 235/467 X |
| 4,797,551 | 1/1989 | Ferrante ................................ 250/234 |
| 4,999,482 | 3/1991 | Yang ................................... 235/467 X |
| 5,028,771 | 7/1991 | Yang ................................... 235/467 X |
| 5,229,588 | 7/1993 | Detwiler et al. ...................... 235/467 |
| 5,475,207 | 12/1995 | Bobba et al. ......................... 235/467 |
| 5,591,954 | 1/1997 | Spencer ............................... 235/467 |

FOREIGN PATENT DOCUMENTS

| | | |
|---|---|---|
| 0-449-490-A1 | 10/1991 | European Pat. Off. . |
| 63-218914 | 9/1988 | Japan . |
| 7713933 | 6/1979 | Netherlands . |

*Primary Examiner*—Michael G. Lee
*Attorney, Agent, or Firm*—Nikaido Marmelstein Murray & Oram LLP

[57] ABSTRACT

A bar code scanner has an increased number of outgoing beams and number of directions of the beams effective for reading of a bar code. The bar code scanner includes a light source for generating a laser beam, a rotary scanning mechanism for receiving the laser beam from the light source and emerging a scanning beam, and a separation mirror for reflecting the scanning beam from the rotary scanning mechanism to separate the scanning beam into a plurality of scanning beams. The bar code scanner further includes a scanning pattern generation mirror mechanism for reflecting the plurality of scanning beams reflected on the separation mirror toward a reading window to generate a scanning pattern composed of the plurality of scanning beams.

13 Claims, 11 Drawing Sheets

FIG. I

BAR CODE SCANNER WITH INCREASED NUMBER OF SCANNING BEAMS HAVING DIFFERENT DIRECTIONS

BACKGROUND OF THE INVENTION

1. Field of the Invention

The present invention relates to a bar code scanner using a laser beam for scanning a bar code to read code data.

2. Description of the Related Art

In many department stores and supermarkets, a POS (point-of-sales) system is introduced at present to efficiently manage merchandise and the checkout operation. This system employs a bar code reader provided with a bar code scanner, for scanning a bar code attached to an item by using a laser beam, detecting signal light scattered from the bar code by using a photodetector, and converting the detected signal light into an information form suitable for computational processing.

In general, the bar code reader is composed of a laser beam generating light source, a laser beam shaping optical system, a scanning optical system, a signal light detecting optical system, a waveform shaping circuit, and a bar code decoding circuit. A laser beam emerging from a He-Ne laser is shaped to have a suitable size by the laser beam shaping optical system, and a scanning pattern capable of universally reading a bar code is formed over a reading window by the scanning optical system. Then, the bar code is irradiated with this scanning pattern.

Scattered signal light reflected from the bar code is collected to the signal light detecting optical system, and is then converted into an electrical signal by a photodetector. The electrical signal is next shaped in the signal waveform shaping circuit, and is next decoded by the bar code decoding circuit. The decoded signal is next transmitted to a POS terminal. Although a recent bar code reader has been progressively reduced in size, the number of beams and the number of directions of beams forming a scanning beam pattern generated in the optical systems have not yet been increased. Accordingly, the reading performance of the scanner is maintained by setting to a given value or more the height of a bar code printed on or attached to an item and thereby increasing the probability that the beams pass across the bar code.

However, a smaller size of the bar code printed on or attached to the item can improve the image for the item. Further, in a supermarket dealing with a large amount of items, it is desired to register the items efficiently in a short time. One method for realizing this desire is to increase the number of scanning laser beams and/or the number of directions of the beams outgoing from the reading window, thereby allowing reading of the bar code irrespective of the size of the bar code, the passing position of the beams, and the angle of the bar code.

As a method of increasing the number of outgoing laser beams effective for reading of the bar code, there is known a method of increasing the rotational speed of a motor for driving a polygon mirror constituting the scanning optical system. In this method, however, it is necessary to increase the power of the motor, causing an increase in size of the motor or an increase in power consumption. Furthermore, the service life of the motor is also shortened. Thus, the above desire is difficult to realize according to this method.

As another method of increasing the number of outgoing beams, there is known a method of increasing the number of reflecting surfaces of the polygon mirror. However, the increase in number of reflecting surfaces of the polygon mirror results in a decrease in size of each reflecting surface and a decrease in scanning angle. As a result, the effective length of each scanning beam outgoing from the reading window becomes short. Further, in general, scanning pattern generation mirror means composed of a pluraliry of reflecting mirrors is provided to obtain a scanning pattern composed of scanning beams having many directions. In this case, the number of outgoing beams and the number of directions of the beams may be increased by a method of increasing the number of the mirrors constituting the scanning pattern generation mirror means. Also in this method, however, the effective length of each scanning beam outgoing from the reading window becomes short.

SUMMARY OF THE INVENTION

It is therefore an object of the present invention to provide a bar code scanner which can increase the number of scanning beams and the number of directions of scanning beams outgoing from a reading window which scanning beams are effective for reading of a bar code.

In accordance with an aspect of the present invention, there is provided a bar code scanner having a reading window, comprising a light source for generating a laser beam; rotary scanning means for receiving the laser beam from the light source and emerging a scanning beam; separation mirror means for reflecting the scanning beam from the rotary scanning means to seprate the scanning beam into at least two scanning beams; and scanning pattern generation mirror means for reflecting the at least two scanning beams reflected on the separation mirror means toward the reading window to generate a scanning pattern composed of a plurality of scanning beams, the scanning pattern generation mirror means being located opposite to the separation mirror means with respect to the rotary scanning means.

Preferably, the rotary scanning means comprises a polygon mirror or a hologram disk. The separation mirror means comprises a first mirror and a second mirror placed at an obtuse angle to the first mirror.

In accordance with another aspect of the present invention, there is provided a bar code scanner having a first and a second reading windows, comprising a light source for generating a laser beam; rotary scanning means for receiving the laser beam from the light source and emerging a scanning beam; a first mirror for reflecting the scanning beam from the rotary scanning means in a first direction; a second mirror for reflecting the scanning beam from the rotary scanning means in a second direction; a first scanning pattern generation mirror means for reflecting the scanning beam reflected on the first mirror toward the first reading window to generate a first scanning pattern composed of a plurality of scanning beams; and a second scanning pattern generation mirror means for reflecting the scanning beam reflected on the second mirror toward the second reading window to generate a second scanning pattern composed of a plurality of scanning beams.

According to the present invention, the separation mirror means comprises a plurality of separation mirrors, and the scanning beam from the rotary scanning means is reflected on each separation mirror toward the scanning pattern generation mirror means, which in turn generates a beam pattern composed of a plurality of beams. The beam pattern is allowed to outgo from the reading window. Accordingly, a plurality of beam patterns whose number corresponds to the number of separation mirrors are generated to outgo from the reading window, so that both the number of outgoing beams and the number of directions of outgoing beams is equal to the product of the number of separation mirrors and the number of mirrors constituting the scanning pattern generation mirror means. Since the performance of reading a bar code is proportional to both the number of outgoing beams and the number of directions of outgoing beams, the performance of a bar code reader can be improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
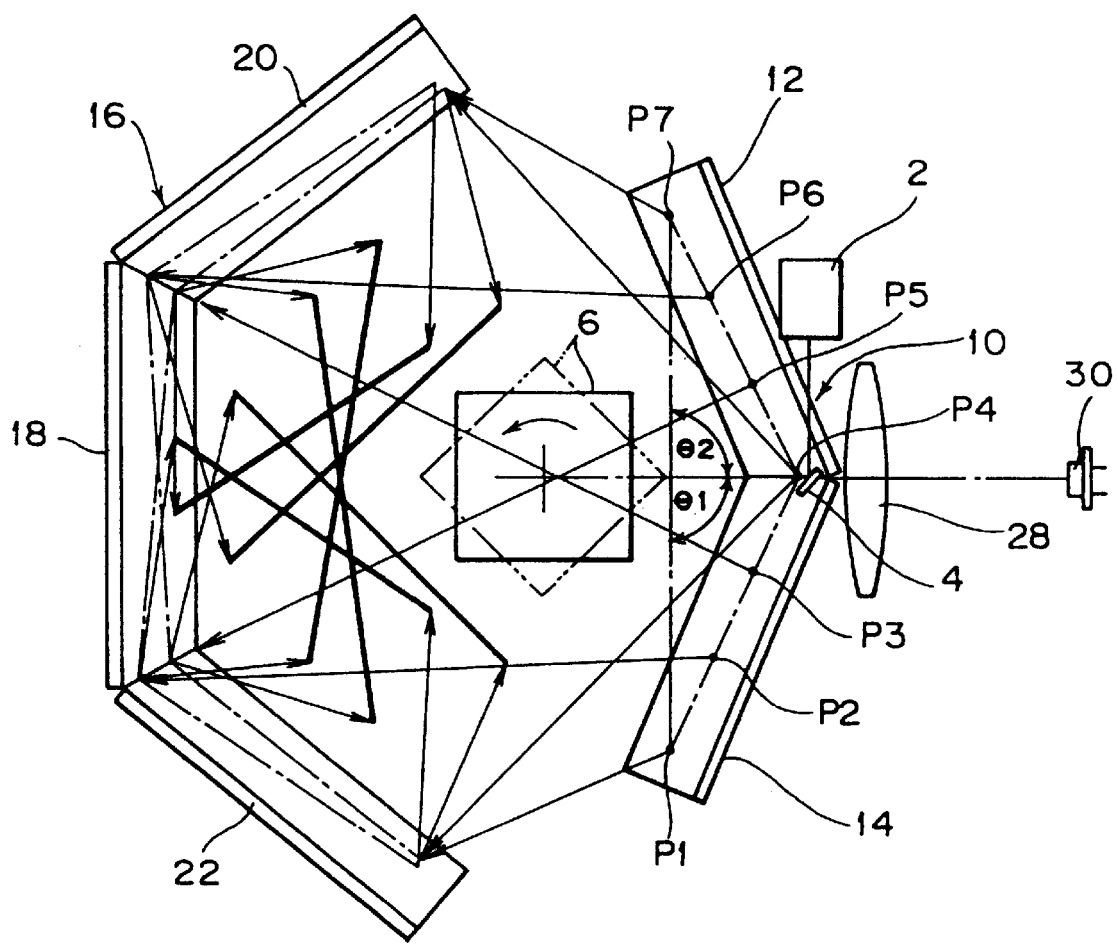
FIG. 1 is a plan view of a first preferred embodiment of the present invention.

A first preferred embodiment of the present invention will now be described with reference to FIGS. 1 to 5. Reference numeral 2 denotes a light source for generating a laser beam, such as a He-Ne laser or a semiconductor laser. The laser beam from the light source 2 is reflected on a mirror 4 towards a polygon mirror 6. The laser beam reflected on the mirror 4 is further reflected on the polygon mirror 6 rotated at high speeds by a motor 8 to advance toward separation mirror means 10. The separation mirror means 10 comprises a first mirror 12 and a second mirror 14 placed at an obtuse angle to the first mirror 12. The polygon mirror 6 in this preferred embodiment has four reflecting surfaces as shown, and it is rotated by the motor 8 in the counterclockwise direction as viewed in FIG. 1.

The laser beam reflected on any one of the reflecting surfaces of the polygon mirror 6 scans in the angular range of $\theta1+\theta2=180°$. As shown in FIG. 1, the laser beam scanning in the angular range of $\theta1$ is reflected on the separation mirror 14, and the laser beam scanning in the angular range of $\theta2$ is reflected on the separation mirror 12. Both angles $\theta1$ and $\theta2$ equal 90 degrees. Reference numeral 16 denotes scanning pattern generation mirror means, which comprises a central mirror 18 and two side mirrors 20 and 22 each placed at an obtuse angle to the central mirror 18. The scanning pattern generation mirror means 16 is located opposite to the separation mirror means 10 with respect to the rotary scanning means 6 as shown. As a result, a long enough optical path length can be realized without enlarging an apparatus.

Figure 2:
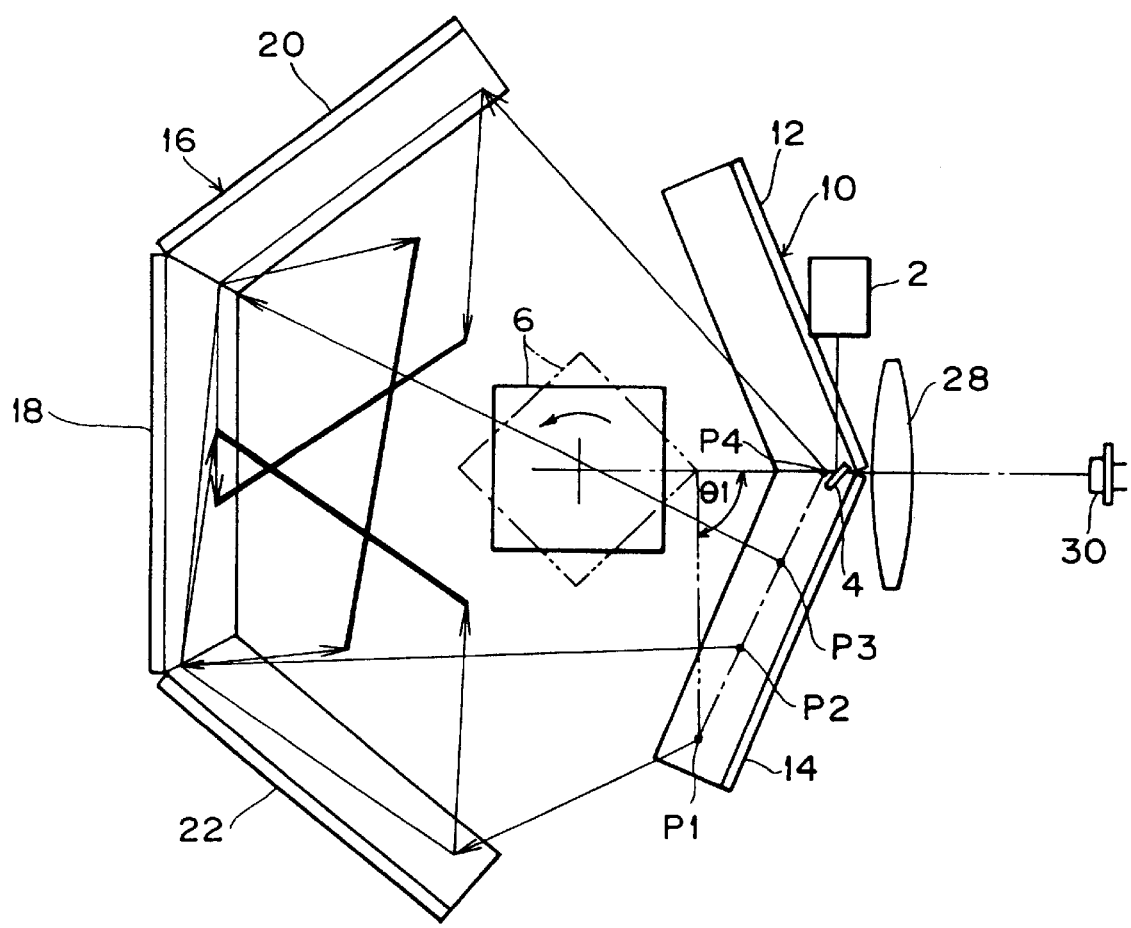
FIG. 2 is a plan view showing a scanning pattern generated by a separation mirror in the first preferred embodiment.

As best shown in FIG. 2, the laser beam scanning the separation mirror 14 is separated into a laser beam reflected on a portion ranging from P1 to P2 and directed toward the side mirror 22, a laser beam reflected on a portion ranging from P2 to P3 and directed toward the central mirror 18, and a laser beam reflected on a portion ranging from P3 to P4 and directed toward the side mirror 20.

Figure 3:
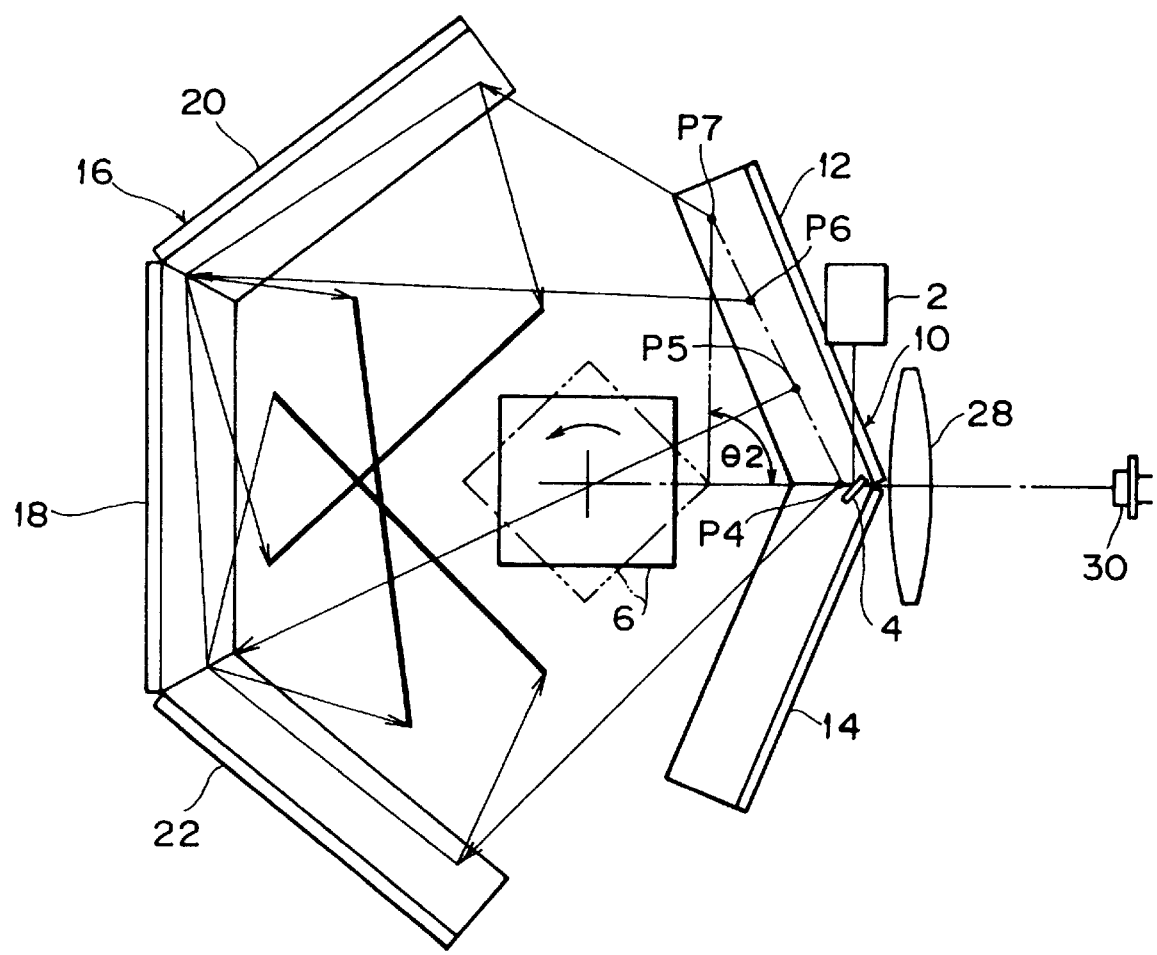
FIG. 3 is a plan view showing a scanning pattern generated by another separation mirror in the first preferred embodiment.
Figure 4:
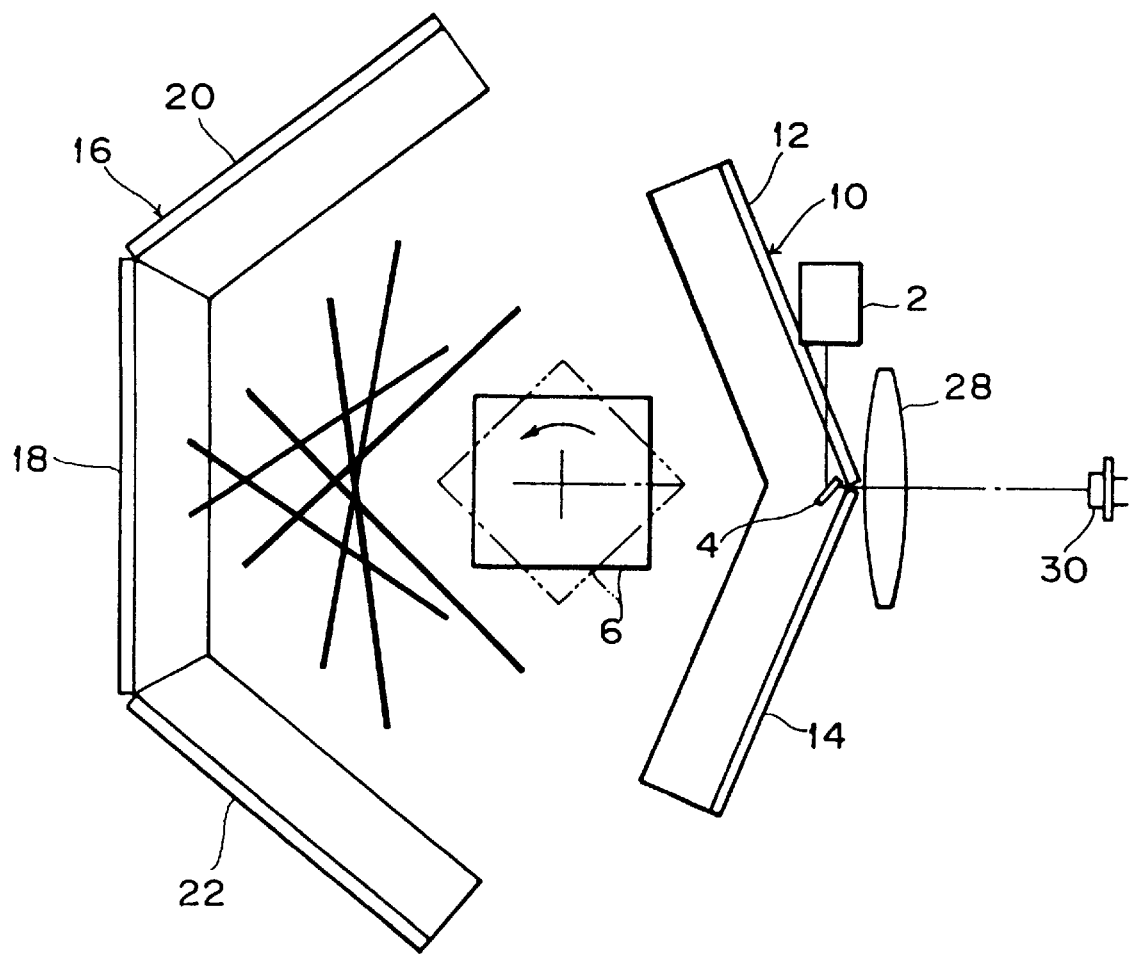
FIG. 4 is a plan view showing a combined scanning pattern generated by the two separation mirrors.

As best shown in FIG. 3, the laser beam scanning the separation mirror 12 is similarly separated into a laser beam reflected on a portion ranging from P4 to P5 and directed toward the side mirror 22, a laser beam reflected on a portion ranging from P5 to P6 and directed toward the central mirror 18, and a laser beam reflected on a portion ranging from P6 to P7 and directed toward the side mirror 20. Accordingly, the laser beam reflected on any one of the reflecting surfaces of the polygon mirror 6 twice scans each of the mirrors 18, 20, and 22 constituting the scanning pattern generation mirror means 16. FIG. 4 shows a combined scanning pattern generated by the two separation mirrors 12 and 14.

Figure 5:
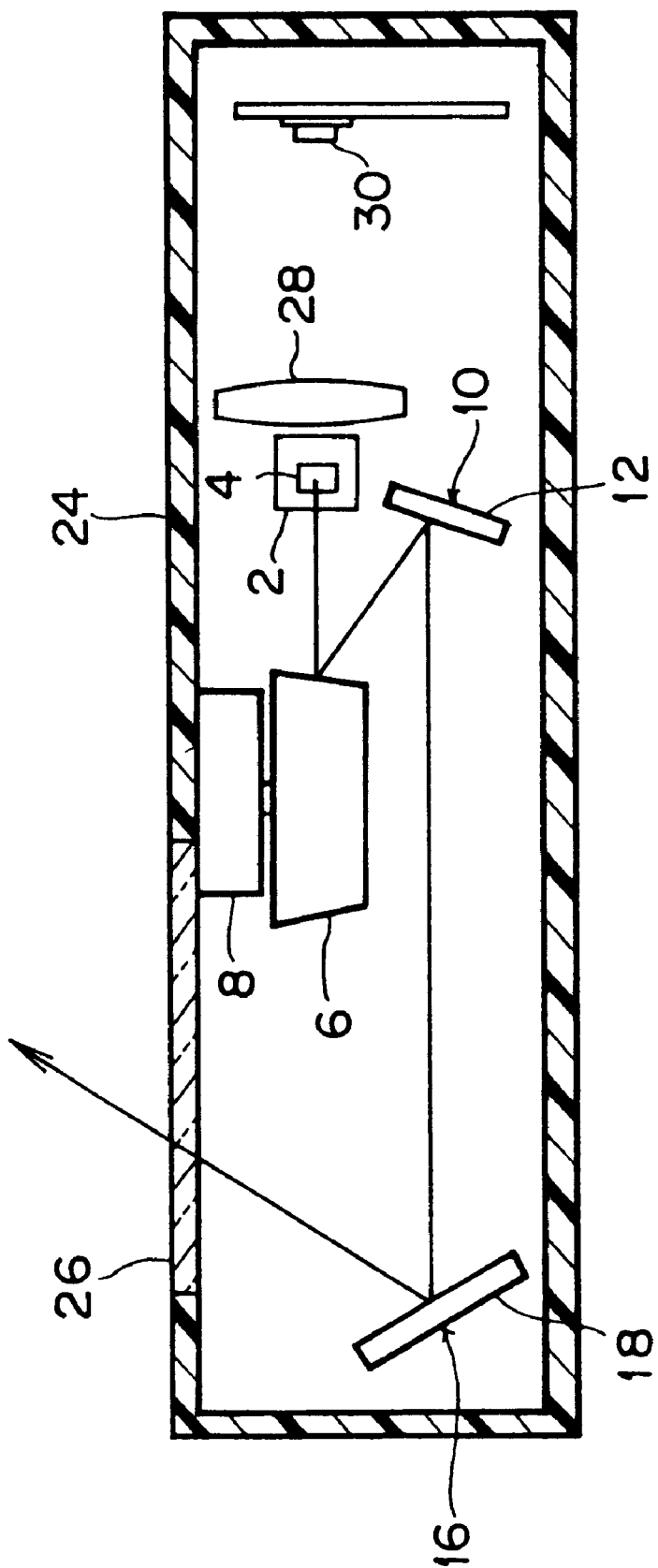
FIG. 5 is a sectional view of the first preferred embodiment.

Referring to FIG. 5, a reading window 26 is provided on the upper surface of a housing 24. Since the motor 8 and the polygon mirror 6 are mounted on an upper portion of the housing 24, the polygon mirror does not interfere with the optical path from the separation mirror means 10 to the scanning pattern generation mirror means 16. The laser beams reflected on the scanning pattern generation mirror means 16 generate a scanning pattern composed of six scanning beams on and over the reading window 26 as shown in FIG. 1. That is, each of the mirrors 18, 20, and 22 generates two scanning beams. This preferred embodiment employs the polygon mirror 6 having four reflecting surfaces, the two separation mirrors 12 and 14, and the three scanning pattern generation mirrors 18, 20, and 22. Therefore, 24 (=4×2×3) scanning beams are totally generated per revolution of the polygon mirror 6. In the case where the four reflecting surfaces of the polygon mirror 6 have different angles of inclination, 24 different scanning beams can be generated.

In this preferred embodiment as mentioned above, the laser beam reflected on any one of the reflecting surfaces of the polygon mirror 6 generates the scanning pattern composed of the six scanning beams having different directions. Accordingly, the whole of a bar code attached to an item can be reliably scanned by the scanning pattern irrespective of the direction of the bar code.

Scattered signal light reflected from the bar code is passed through the reading window 26 and is sequentially reflected on the scanning pattern generation mirror means 16, the separation mirror means 10, and the polygon mirror 6. Thereafter, the scattered signal light is collected to a photodetector 30 by a lens 28. The scattered signal light thus collected is converted into an electrical signal by the photodetector 30, and the electrical signal is then converted into a digital signal by an A/D converter not shown. The digital signal is then decoded by a bar code decoding circuit not shown.

According to this preferred embodiment, the separation mirror means 10 consisting of the two separation mirrors 12 and 14 is provided, so that it is possible to increase the number of scanning beams and the number of directions of scanning beams outgoing from the reading window 26, which beams are effective for reading of the bar code.

Figure 6:
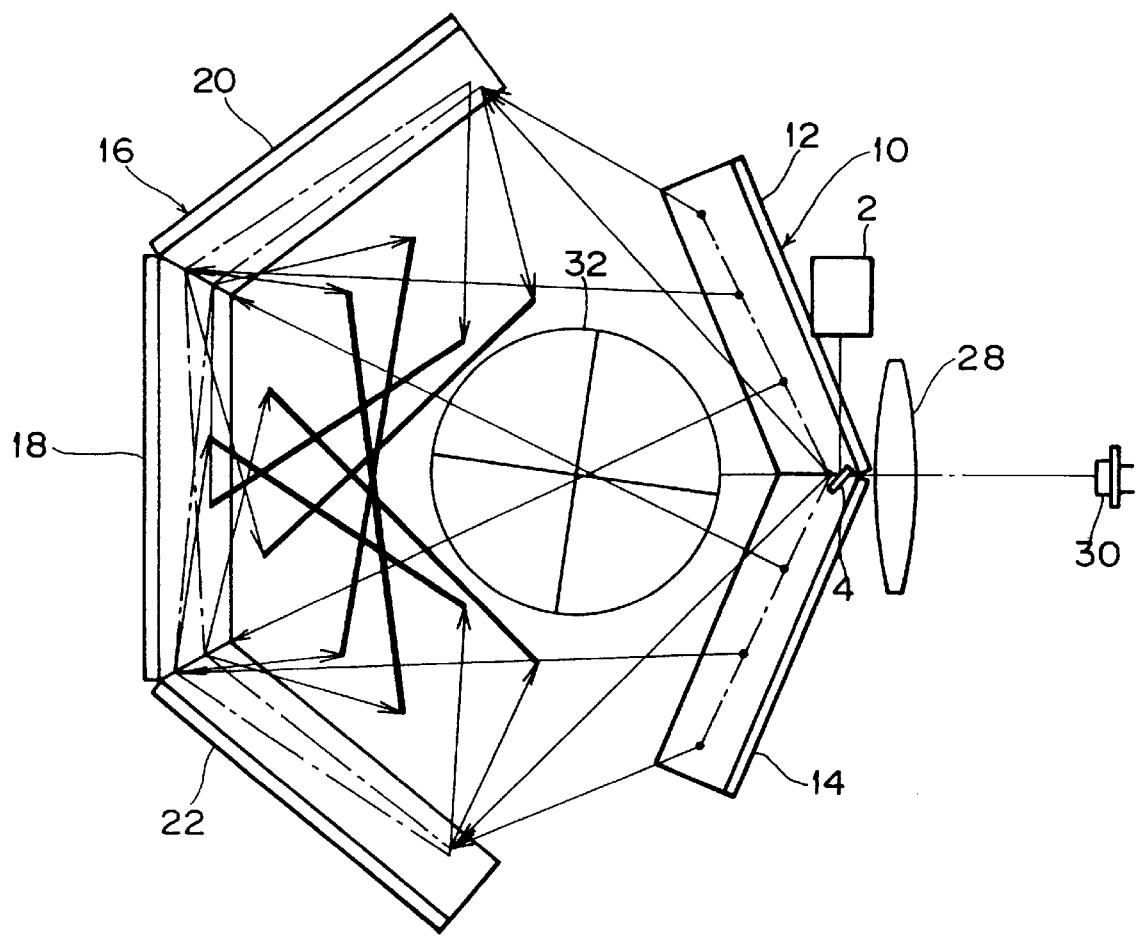
FIG. 6 is a plan view of a second preferred embodiment of the present invention.
Figure 7:
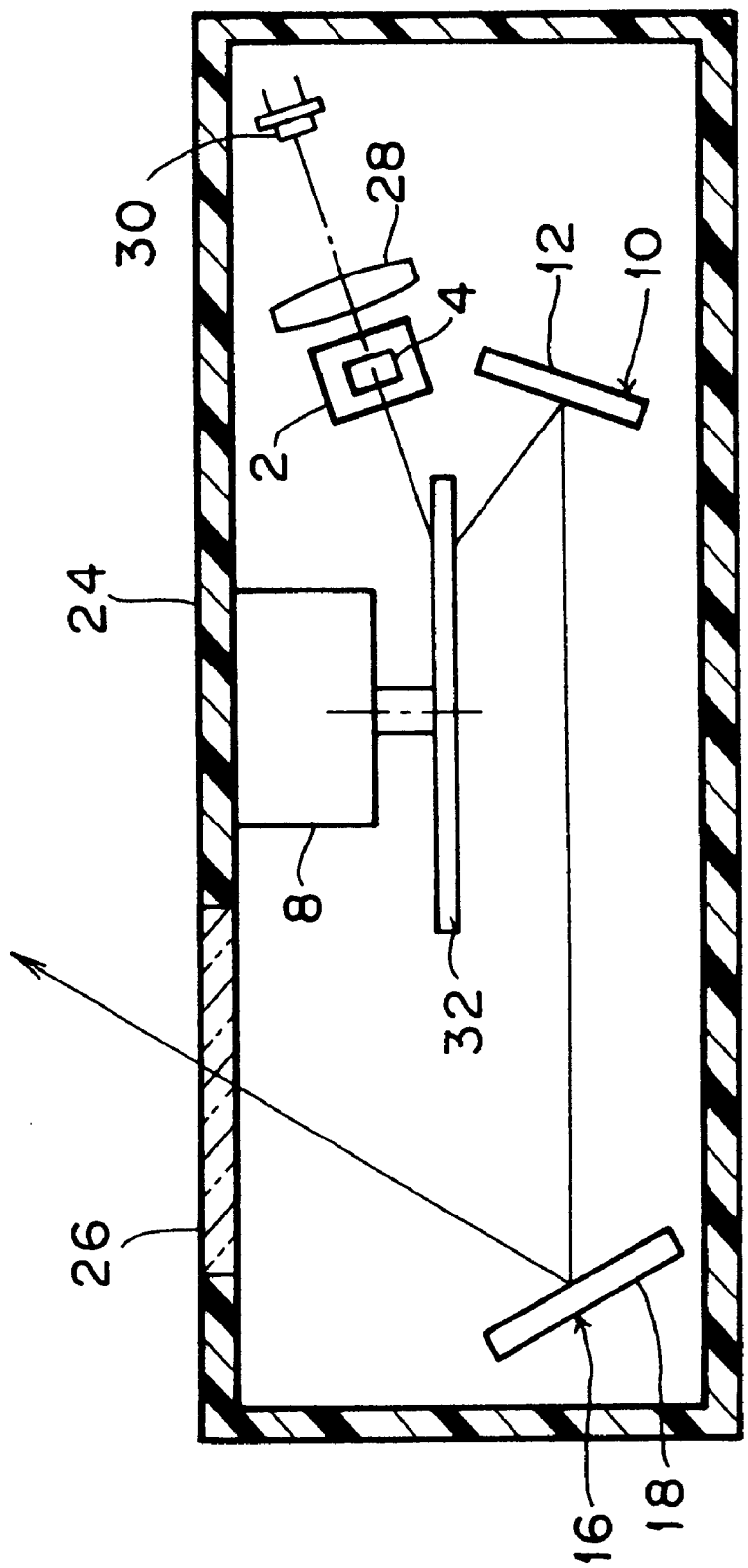
FIG. 7 is a sectional view of the second preferred embodiment.

Referring to FIGS. 6 and 7, there are shown a plan view and a sectional view of a second preferred embodiment of the present invention, respectively. This preferred embodiment employs a hologram disk 32 as the rotary scanning means in place of the polygon mirror employed in the first preferred embodiment.

The hologram disk 32 is divided into four regions, and a transmission type hologram is formed in each region to refract a laser beam. The hologram disk 32 is rotated by a motor 8. The laser beam incident on the hologram disk 32 rotated at high speeds by the motor 8 is refracted by the hologram disk 32 to enter separation mirror means 10. The other configuration and operation in this preferred embodiment are similar to those in the first preferred embodiment, and the description thereof will be omitted herein. The hologram disk 32 can be produced to have four different hologram patterns in respective four regions to produce different difraction angles.

Figure 8:
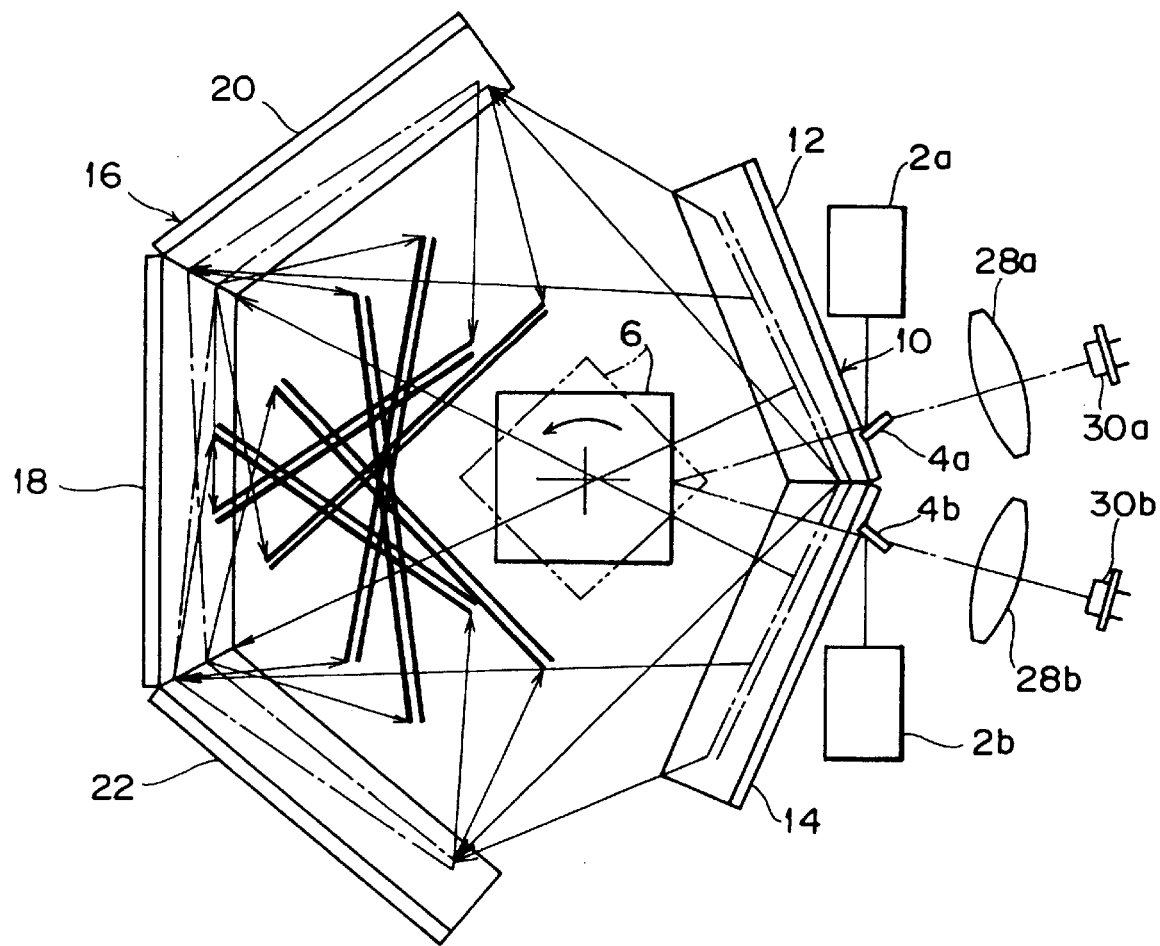
FIG. 8 is a plan view of a third preferred embodiment of the present invention.
Figure 9:
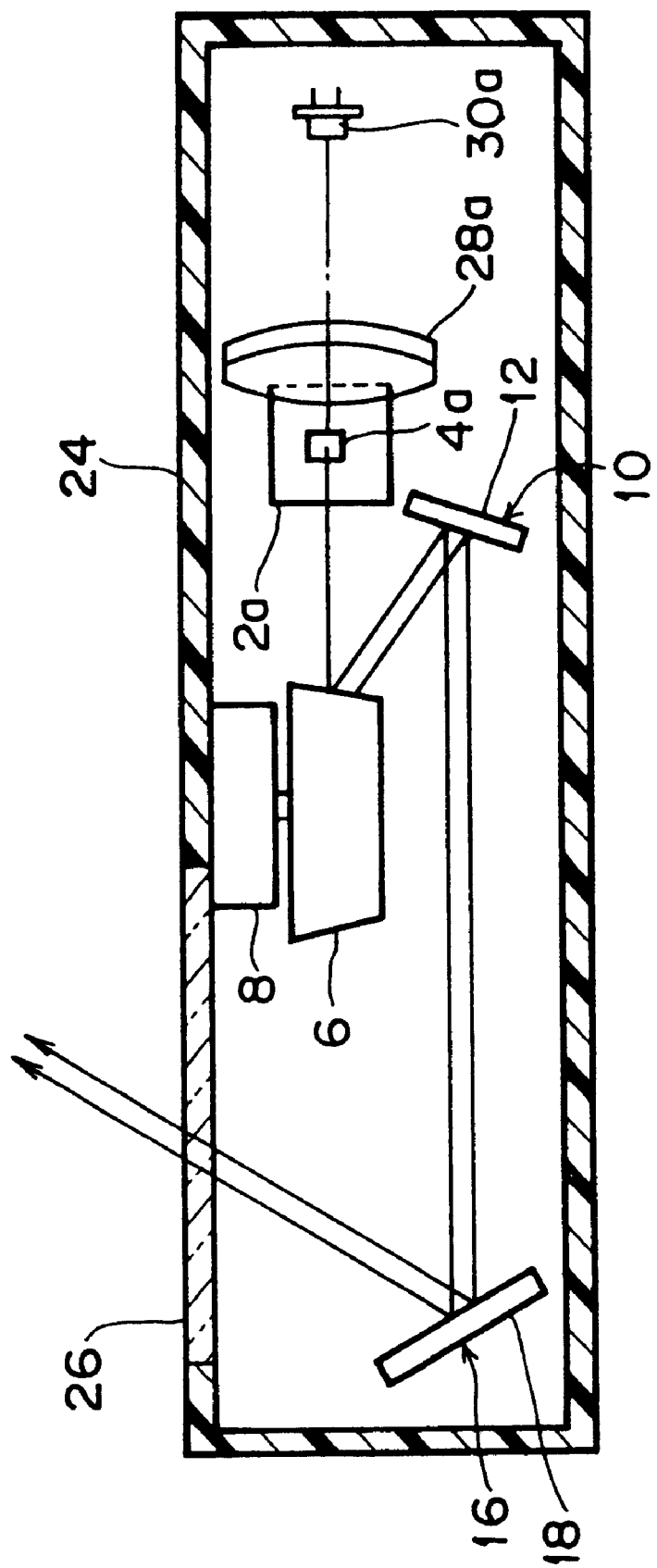
FIG. 9 is a sectional view of the third preferred embodiment.

FIGS. 8 and 9 show a plan view and a sectional view of a third preferred embodiment of the present invention, respectively. This preferred embodiment employs two light sources 2a and 2b. A laser beam emitted from the light source 2a is reflected on a mirror 4a to enter a polygon mirror 6, and a laser beam emitted from the light source 2b is reflected on a mirror 4b to enter the polygon mirror 6.

Due to the two light sources 2a and 2b being provided, two photodetectors 30a and 30b are respectively provided to detect scattered signal light from a bar code scanned by the laser beams emitted from the two light sources 2a and 2b. Further, a lens 28a is provided to collect the scattered signal light to the photodetector 30a, and a lens 28b is provided to collect the scattered signal light to the photodetector 30b. The other configuration and operation in this preferred embodiment are similar to those in the first preferred embodiment, and the description thereof will be omitted herein. According to this preferred embodiment, the two light sources are provided, so that the number of scanning beams outgoing from a reading window 26 can be doubled over that in the first preferred embodiment.

Figure 10:
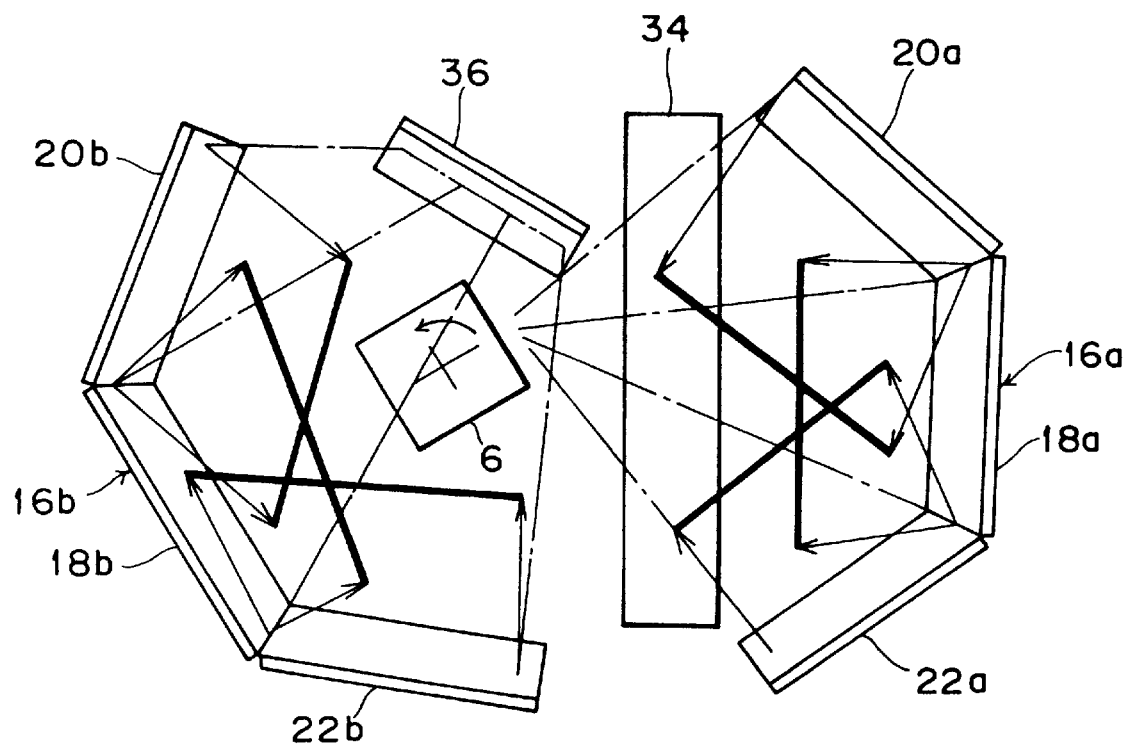
FIG. 10 is a plan view of a fourth preferred embodiment of the present invention.
Figure 11:
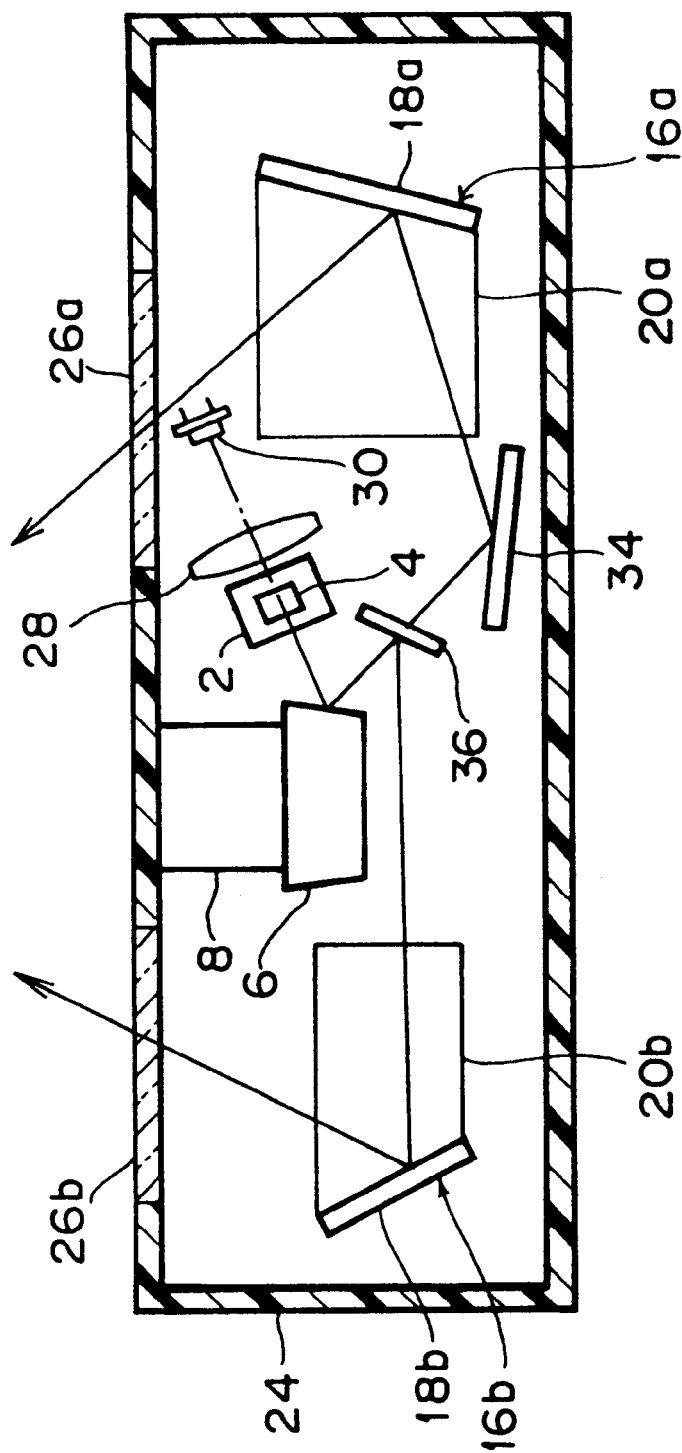
FIG. 11 is a sectional view of the fourth preferred embodiment.

Referring to FIGS. 10 and 11, there are shown a plan view and a sectional view of a fourth preferred embodiment of the present invention. In the plan view of FIG. 10, a light source 2, a mirror 4, a lens 28, and a photodetector 30 are not shown. This preferred embodiment employs a first and a second scanning pattern generation mirror means 16a and 16b. The first scanning pattern generation mirror means 16a comprises a central mirror 18a and two side mirrors 20a and 22a, and the second scanning pattern generation mirror means 16b comprises a central mirror 18b and two side mirrors 20b and 22b.

A polygon mirror 6 is rotated at high speeds in the counterclockwise direction as viewed in FIG. 10. A laser beam emitted from the light source 2 is reflected on the mirror 4 to enter the polygon mirror 6. The laser beam reflected on the polygon mirror 6 scans in the angular range of 180°. The scanning beam from the polygon mirror 6 is reflected on a mirror 34 to advance toward the first scanning pattern generation mirror means 16a, and is also reflected on a mirror 36 to advance toward the second scanning pattern generation mirror means 16b.

The scanning beam reflected on the first scanning pattern generation mirror means 16a is directed toward a first reading window 26a to form a scanning pattern composed of three scanning beams having different directions on the first reading window 26a. On the other hand, the scanning beam reflected on the second scanning pattern generation mirror means 16b is directed toward a second reading window 26b to form a scanning pattern composed of three scanning beams on the second reading window 26b.

According to this preferred embodiment, the two scanning patterns independently outgo from the two reading windows 26a and 26b. Accordingly, a bar code attached to an item can be reliably read by moving the item across the two reading windows 26a and 26b. That is, even if reading of the bar code over one of the two reading windows ends in failure, the bar code can be read again over the other reading window. In other words, since the beams scan the bar code on the item in different directions, the bar code can be read irrespective of its direction.

According to the present invention, it is possible to increase the number of beams and the number of directions of beams outgoing from the reading window which beams are effective for reading of a bar code. Therefore, the performance of the bar code scanner can be improved.

What is claimed is:

1. A bar code scanner having a reading window, comprising:

a light source for generating a laser beam;

a rotary scanning means for receiving said laser beam from said light source and for emerging a scanning beam;

a separation mirror means for reflecting said scanning beam from said rotary scanning means to separate said scanning beam into at least two scanning beams, said separation mirror means including a first mirror and a second mirror; and a scanning pattern generation mirror means for reflecting said at least two scanning beams reflected on said separation mirror means toward said reading window to generate a scanning pattern composed of a plurality of scanning beams, said separation mirror means and said scanning pattern generation mirror means being disposed facing each other and sandwiching said rotary scanning means, said scanning pattern generation mirror means including a plurality of mirror, each of the plurality of mirrors independently of one another producing one of the plurality of scanning beams of the scanning pattern;

wherein said separation mirror means and said scanning pattern generation mirror means are so disposed that a) each scanning beam, which is reflected on said first mirror, sequentially scans each of said plurality of mirrors of said scanning pattern generation mirror to produce a number of scanning beams, and b) each scanning beam, which is reflected on said second mirror, sequentially scans each of the same said plurality of mirrors of said scanning pattern generation mirror means as the scanning beam from the first mirror to produce a number of scanning beams, a total number of scanning beams being a product of a number of mirrors of said separation mirror means and a number of mirrors of said scanning pattern generation mirror means.

2. A bar code scanner according to claim 1, wherein said bar code scanner has a housing having the reading window mounted thereon, wherein said rotary scanning means is mounted on an upper side of the housing and an optical path from said separation mirror means to said scanning pattern generation mirror means passes under said rotary scanning means.

3. A bar code scanner according to claim 1, wherein said rotary scanning means comprises a polygon mirror.

4. A bar code scanner according to claim 1, wherein said rotary scanning means comprises a hologram disk.

5. A bar code scanner according to claim 1, wherein said light source comprises two light sources.

6. A bar code scanner having a first and a second reading windows, comprising:

a light source for generating a laser beam;

a rotary scanning means for receiving said laser beam from said light source and for emerging a scanning beam;

a first mirror for reflecting said scanning beam from said rotary scanning means in a first direction;

a second mirror for reflecting said scanning beam from said rotary scanning means in a second direction;

a first scanning pattern generation mirror means for reflecting said scanning beam reflected on said first mirror toward said first reading window to generate a first scanning pattern composed of a plurality of scanning beams, said first scanning pattern generation mirror means including a plurality of mirrors, each of the plurality of mirrors independently of one another producing one of the plurality of scanning beams of the first scanning pattern; and a second scanning pattern generation mirror means for reflecting said scanning beam reflected on said second mirror toward said second reading window to generate a second scanning pattern composed of a plurality of scanning beams, said second scanning pattern generation mirror means including a plurality of mirrors, each of the plurality of mirrors independently of one another producing one of the plurality of scanning beams of the second scanning pattern;

wherein said first mirror and said plurality of mirrors of said first scanning pattern generation mirror means are so disposed that the scanning beam, which is reflected on said first mirror, directly impinges on and sequentially scans each of said plurality of mirrors of said first scanning pattern generation mirror means, and said second mirror and said plurality of mirrors of said second scanning pattern generation mirror means are so disposed that the scanning beam, which is reflected on said second mirror, directly impinges on and sequentially scans each of said plurality of mirrors of said second scanning pattern generation means.

7. A bar code scanner according to claim 6, wherein said rotary scanning means comprises a polygon mirror.

8. A bar code scanner having a reading window, comprising:

a light source for generating a laser beam;

a rotary scanning means for receiving said laser beam from said light source and for emerging a scanning beam;

a first mirror for reflecting said scanning beam from said rotary scanning means to separate said scanning beam in a first direction;

a second mirror for reflecting said scanning beam from said rotary scanning means to separate said scanning beam in a second direction;

a first scanning pattern generation mirror means for reflecting said scanning beam reflected on said first mirror toward said reading window to generate a first scanning pattern composed of a plurality of scanning beams, said first scanning pattern generation mirror means including a plurality of mirrors, each of the plurality of mirrors independently of one another producing one of the plurality of scanning beams of the first scanning pattern; and a second scanning pattern generation mirror means for reflecting said scanning beam, reflected on said second mirror toward said reading window to generate a second scanning pattern composed of a plurality of scanning beams, said second scanning pattern generation mirror means including a plurality of mirrors, each of the plurality of mirrors independently of one another producing one of the plurality of scanning beams of the second scanning pattern;

wherein said first scanning pattern generation mirror means and said second scanning pattern generation mirror means are disposed sandwiching said rotary scanning means; and wherein said first mirror and said plurality of mirrors of said first scanning pattern generation mirror means are so disposed that the scanning beam, which is reflected on said first mirror, directly impinges on and sequentially scans each of said plurality of mirrors of said first scanning pattern generation mirror means, and said second mirror and said plurality of mirrors of said second scanning pattern generation mirror means are so disposed that the scanning beam, which is reflected on said second mirror, directly impinges on and sequentially scans each of said plurality of mirrors of said second scanning pattern generation means.

9. A bar code scanner according to claim 8, wherein said bar code scanner includes a housing having a bottom inner surface and wherein at least one of said first and second mirrors is mounted on the bottom inner surface of the housing to reflect said scanning beam upwards.

10. A bar code reader comprising:

a light source;

a rotary scanning unit having a reflection surface for reflecting a light beam incident thereon, said rotary scanning unit being driven by a motor;

a separation mirror unit for reflecting the light beam reflected from said rotary scanning unit, said separation mirror unit including a plurality of first mirrors and being arranged in symmetry with respect to an optical path of the light beam incident on said rotary scanning unit from said light source;

a scanning pattern generation mirror unit for reflecting the light beam reflected from said separation mirror unit, said scanning pattern generation mirror unit including a plurality of second mirrors, each of the plurality of second mirrors independently of one another producing a scanning beam and said scanning pattern generation mirror unit being arranged in symmetry with respect to an extension of said optical path, said separation mirror unit and said scanning pattern generation mirror unit being disposed facing each other and sandwiching said rotary scanning unit, wherein each scanning beam reflected on each of said plurality of first mirrors of said separation mirror unit directly impinges on and sequentially scans each of said plurality of second mirrors of said scanning pattern generation mirror unit; and a photodetector for detecting a reflected light from an item having a bar code, said item being scanned by the light beam reflected from said scanning pattern generation mirror unit.

11. An optical scanning device comprising:

first and second light sources;

a rotary scanning unit having a reflection surface for reflecting light beams incident thereon from said first and second light sources, said rotary scanning unit being driven by a motor;

a separation mirror unit for reflecting the light beams from said rotary scanning unit, said separation mirror unit including a plurality of mirrors and being arranged in symmetry with respect to a bisector of an angle formed by a first optical path of the light beam incident on said rotary scanning unit from said first light source and second optical path of the light beam incident on said rotary scanning unit from said second light source; and a scanning pattern generation mirror unit for producing a scanning beam pattern by reflecting the light beams reflected from said separation mirror unit, said scanning pattern generation mirror unit including a plurality of mirrors, each of the plurality of mirrors independently of one another producing a scanning beam and being arranged in symmetry with respect to an extension of said bisector, said separation mirror unit and said scanning pattern generation mirror unit being disposed facing each other and sandwiching said rotary scanning unit, wherein each scanning beam reflected on each of said plurality of mirrors of said separation mirror unit directed impinges on and sequentially scans each of said plurality of mirrors of said scanning pattern generation mirror unit.

12. An optical scanning device comprising:

a light source;

a rotary scanning unit having a reflection surface for reflecting a light beam incident thereon;

a separation mirror unit for reflecting the light beam reflected from said rotary scanning unit, said separation mirror unit including a plurality of mirrors disposed adjacent to each other, said plurality of mirrors being so arranged that each included angle between adjacent mirrors is less than 180 degrees; and a scanning pattern generation mirror unit for reflecting the light beam reflected from said separation mirror unit, said scanning pattern generation mirror unit including a plurality of mirrors which are disposed adjacent to each other and which each independently of one another produce a scanning beam, said plurality of mirrors being so arranged that each included angle between adjacent mirrors is less than 180 degrees, said separation mirror unit and said scanning pattern generation mirror unit being disposed facing each other and sandwiching said rotary scanning unit;

wherein each scanning beam reflected on each of said plurality of mirrors of said separation mirror unit directly impinges on and sequentially scans each of said plurality of mirrors of said scanning pattern generation mirror unit.

13. A bar code reader comprising:

a light source;

a rotary scanning unit having a reflection surface for generating a scanning beam;

a separation mirror unit for reflecting the scanning beam reflected from said rotary scanning unit, said separation mirror unit including a plurality of mirrors and being arranged in symmetry with respect to an optical path of a light beam incident on said rotary scanning unit from said light source;

a scanning pattern generation mirror unit for reflecting the scanning beam reflected from said separation mirror unit, said scanning pattern generation mirror unit including a plurality of mirrors, each of the plurality of mirrors independently of one another producing a scanning beam and being arranged in symmetry with respect to an extension of said optical path, said separation mirror unit and said scanning pattern generation mirror unit being disposed facing each other and sandwiching said rotary scanning unit; and a window for allowing said scanning beam reflected from said scanning pattern generation mirror unit to pass therethrough;

wherein each scanning beam reflected on each of said plurality of mirrors of said separation mirror unit directly impinges on and sequentially scans each of said plurality of mirrors of said scanning pattern generation mirror unit; and wherein each scanning beam reflected on each of said plurality of mirrors of said scanning pattern generation mirror unit is emerged as a scanning line for forming a scanning pattern from said window.

* * * * *